UNITED STATES PATENT OFFICE.

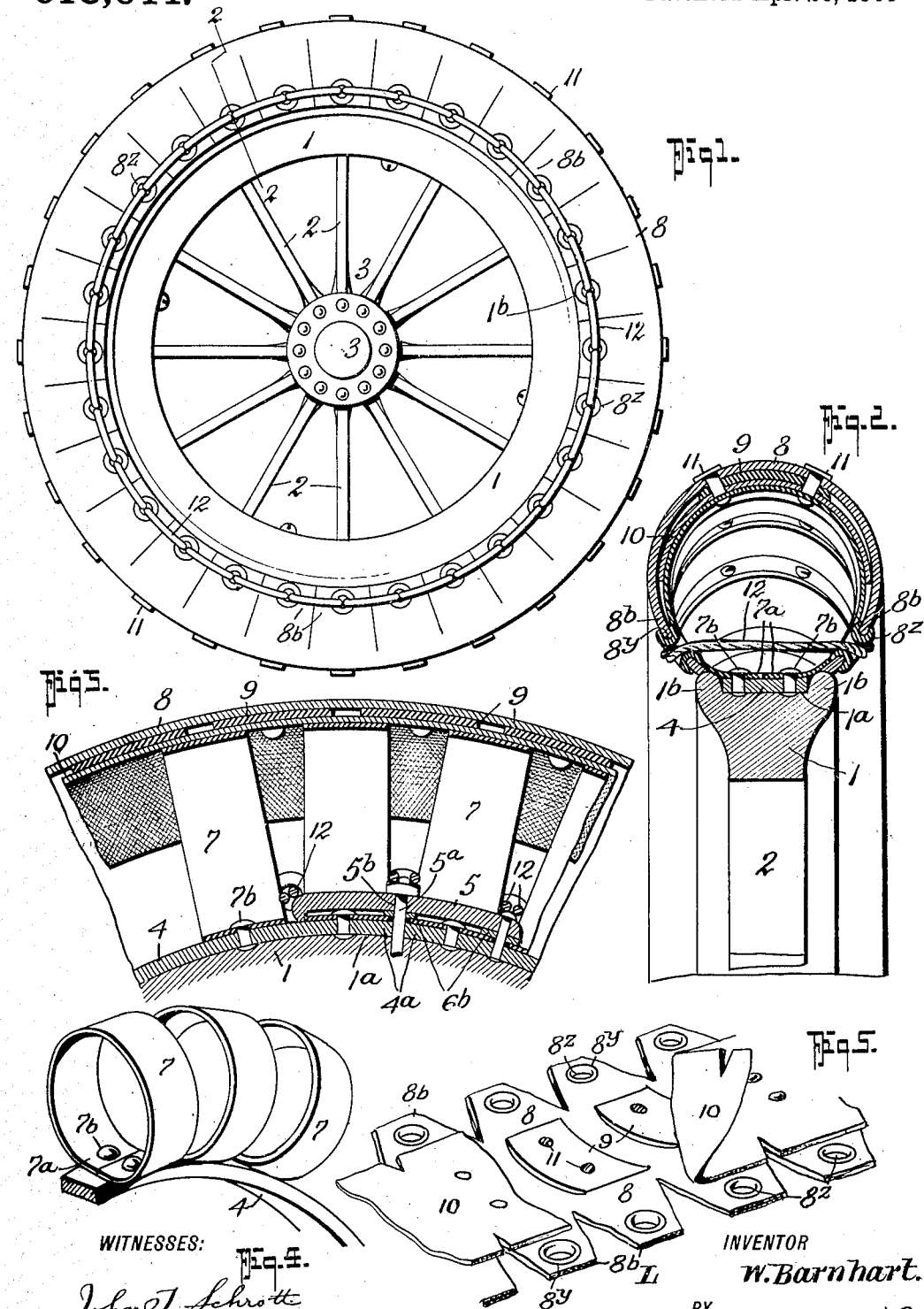

LLOYD W. BARNHART, OF VAN WERT, OHIO.

VEHICLE-WHEEL.

No. 918,644.

Specification of Letters Patent.

Patented April 20, 1909.

Application filed April 11, 1908. Serial No. 426,698.

*To all whom it may concern:*

Be it known that I, LLOYD W. BARNHART, residing at Van Wert, in the county of Van Wert and State of Ohio, have invented certain new and useful Improvements in Vehicle-Wheels, of which the following is a specification.

My invention relates to certain new and useful improvements in vehicle wheels of the resilient type, and in its generic nature the invention embodies an improved construction of vehicle wheel in which the tire is composed of resilient spring members secured to a band surrounding the rim of the wheel and over which a protecting sheathing is placed, the protecting sheathing and the springs of the tire being interlaced to prevent creeping of the sheathing, and to hold the same in place.

In its more specific nature, my invention embodies those novel details of construction, combination and arrangement of parts, all of which will be first described in detail, and then be specifically pointed out in the appended claims, reference being had to the accompanying drawings, in which:—

Figure 1, is a side elevation of an automobile wheel embodying my invention. Fig. 2, is a vertical cross section of a portion thereof on the line 2—2 of Fig. 1. Fig. 3, is a central longitudinal section of a portion of the wheel. Fig. 4, is a detail perspective view of the spring carrying strip and the number of springs secured thereto. Fig. 5, is a detail diagrammatic view of the sheathing and its attached parts.

Referring now to the accompanying drawings, in which like letters and numerals of reference indicate like parts in all of the figures, 1 designates the rim of the wheel which is provided with a peripheral groove $1^a$ and the peripheral flanges $1^b$ at each side of the rim. The spokes 2 are attached to the rim and to the hub 3 in any approved manner, as the construction of the spokes and hub forms no part of my present invention.

Mounted within the groove $1^a$ of the rim is a band or strip 4 of steel, or other suitable material, the ends $4^a$—$4^a$ of which are held together by a clamp 5 which presses them against the rim 1, the clamp is held in place by a bolt $5^a$ passing through the rim and threaded into the clamp at $5^b$ as clearly shown, spacing members $6^b$ being interposed between the center and one end of the clamp 5 and the rim to allow for the thickness of the spring members 7, while the other end of the clamp 5 is formed with a hook which is designed to catch one spring and thereby make a fastening.

The resilient, or spring members 7 are made of steel or any other suitable material, and have their ends $7^a$ secured to strip 4 by rivets $7^b$ or in any other suitable manner, it being understood that the springs 7 are spaced at intervals around the periphery of the wheel, as clearly shown in Fig. 3 of the drawings, spaces being left between the adjacent springs for a purpose which will be presently understood.

Held over the springs 7 is a sheathing or covering, composed of an outer casing 8 of leather, rubber, rubber-cloth, or any other suitable material, the casing 8 carrying on its inner surface a series of metallic plates 9 that are secured to the casing by rivets 11, or in any other suitable manner, the rivets 11 on their outer surfaces may also serve as a means to prevent slipping of the wheel.

Between the springs 7 and the plates 9 a sheet of cloth, canvas or other suitable material 10 is secured to the outer tube or sheathing 8 by rivets 11 hereinbefore mentioned.

The plates 9 are spaced slightly apart and are held over the tread surface of the springs 7, as clearly indicated in Fig. 3 of the drawings, to form, as it were, a continuous metallic tread and at the same time bridge over the gaps between the springs 7—7.

The rivets 11 projecting on the inside of the casing or sheathing between the springs 7—7, aid in preventing the casing from slipping on the springs around the wheel.

The casing 8 is provided with pendent portions $8^b$ that are apertured as at $8^y$ and provided with eyelets $8^z$ through which the lacing cord 12 is adapted to pass. The cord 12 is laced through the eyelets and between the springs 7, from side to side, so that the casing tightly fits the springs and practically closes the chamber within the springs.

By virtue of the lacing passing between the springs 7—7 and from side to side of the wheel, the transverse sections of the lacing cord will prevent the casing from slipping around the wheel, or in other words, prevent creeping of the casing, thus assisting the rivets 11 in performing that function.

It should be understood that I do not limit myself to any specific proportions of parts, nor any specific materials used in the make-up of my wheel as the specific details of construction may be modified without departing from the spirit of the invention or the scope of the appended claims, and any suitable materials may be used as are found convenient in practice, also the relative size and proportion of parts may be altered, as conditions may require.

From the foregoing description taken in connection with the accompanying drawings, it is thought the complete construction, operation and numerous advantages of my invention will be readily understood by those skilled in the art to which the invention appertains.

What I claim is:—

1. In a vehicle wheel, a rim having a peripheral recess or groove, a metallic band held in said groove, a series of circular spring members secured to said band and spaced apart to lie transversely of the band, a sheathing for said spring members, and means passing through said sheathing between said spring members for retaining said sheathing thereon.

2. In a vehicle wheel, a rim having a peripheral recess or groove, a metallic band held in said groove, a series of circular spring members secured to said band and spaced apart to lie transversely of the band, a sheathing for said spring members, means passing between said spring members for retaining said sheathing thereon, said last named means comprising eyelets held by the sheathing and a lacing cord laced through said eyelets from side to side of the wheel and between said spring members.

3. In a vehicle wheel, a rim having a peripheral groove, a flat metallic plate held in said groove, means for securing said plate at the ends of said rim, a series of flat tubular spring members secured to said plate and spaced at intervals apart around the circumference of the rim, a sheathing for said spring members consisting of an outer casing and an inner covering interposed between the outer casing and the tread surfaces of said spring members, metallic plates held between said inner and outer casing along the tread surfaces of the spring members to overlap adjacent spring members, and means for retaining the casing in position.

4. In a vehicle wheel, a rim having a peripheral groove, a flat metallic plate held in said groove, means for securing said plate at the ends of said rim, a series of flat tubular spring members secured to said plate and spaced at intervals apart around the circumference of the rim, a sheathing for said spring members consisting of an outer casing and an inner covering interposed between the outer casing and the tread surfaces of said spring members, metallic plates held between said inner and outer casing along the tread surfaces of the spring members to overlap adjacent spring members, means for retaining the casing in position, and means for securing the outer casing, the inner casing and the interposed metallic plates together.

5. In a vehicle wheel, a rim having a peripheral groove, a flat metallic plate held in said groove, means for securing said plate at the ends of said rim, a series of flat tubular spring members secured to said plate and spaced at intervals apart around the circumference of the rim, a sheathing for said spring members consisting of an outer casing and an inner covering interposed between the outer casing and the tread surfaces of said spring members, metallic plates held between said inner and outer casing along the tread surfaces of the spring members to overlap adjacent spring members, means for retaining the casing in position, said casing retaining means comprising lacing cords passed through apertures in the outer casing of the sheathing and laced between the spring members adjacent to the rim of the wheel and from side to side.

6. In a vehicle wheel, a rim having a peripheral recess or groove, a metallic band held in said groove, a series of circular spring members secured to said band and spaced apart to lie transversely of the band, a sheathing for said spring members, metallic plates secured to the inner side of the tread surface of said sheathing to overlap said circular spring members, a lacing cord passed through said sheathing adjacent to the rim and laced through between said circular spring members from side to side to retain the sheathing in place and prevent creeping thereof.

LLOYD W. BARNHART.

Witnesses:
H. W. BLACHEY,
W. H. MOZIER.